United States Patent
Chen et al.

(10) Patent No.: US 11,968,449 B2
(45) Date of Patent: Apr. 23, 2024

(54) CAMERA LENS SMOOTHING METHOD AND PORTABLE TERMINAL

(71) Applicant: ARASHI VISION INC., Shenzhen (CN)

(72) Inventors: Cong Chen, Shenzhen (CN); Zhuo Guo, Shenzhen (CN); Jingkang Liu, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 193 days.

(21) Appl. No.: 17/579,670

(22) Filed: Jan. 20, 2022

(65) Prior Publication Data

US 2022/0141387 A1 May 5, 2022

Related U.S. Application Data

(63) Continuation of application No. PCT/CN2020/101987, filed on Jul. 15, 2020.

(30) Foreign Application Priority Data

Jul. 23, 2019 (CN) .......................... 201910664290.2

(51) Int. Cl.
*H04N 23/68* (2023.01)
*G06T 3/60* (2006.01)
*G06T 5/70* (2024.01)

(52) U.S. Cl.
CPC ............. *H04N 23/683* (2023.01); *G06T 3/60* (2013.01); *G06T 5/70* (2024.01); *H04N 23/6812* (2023.01)

(58) Field of Classification Search
CPC ............. H04N 23/683; H04N 23/6812; H04N 5/2628; H04N 23/682; G06T 3/60; G06T 5/002; G06T 2207/10016; G06T 2207/20201; G06T 5/003
USPC ........................................................ 348/275
See application file for complete search history.

(56) References Cited

U.S. PATENT DOCUMENTS

| | | | |
|---|---|---|---|
| 5,051,751 A | 9/1991 | Gray | |
| 2014/0146205 A1* | 5/2014 | Xu | ........................ H04N 23/683 348/239 |
| 2014/0294361 A1* | 10/2014 | Acharya | ................. G06T 17/00 386/241 |
| 2016/0112701 A1* | 4/2016 | Chao | .................. H04N 23/6812 348/187 |

(Continued)

FOREIGN PATENT DOCUMENTS

| | | |
|---|---|---|
| CN | 106027852 A | 10/2016 |
| CN | 106780370 A | 5/2017 |
| CN | 107241544 A | 10/2017 |

(Continued)

*Primary Examiner* — Usman A Khan
(74) *Attorney, Agent, or Firm* — IPRO, PLLC

(57) ABSTRACT

A camera lens smoothing method includes: obtaining a current video frame of a camera video and gyroscope information of the current video frame, and calculating a current first rotation matrix; conducting smoothing on the first rotation matrix, and calculating a third rotation matrix; conducting viewpoint decomposition on the current video frame according to the third rotation matrix, and calculating a fourth rotation matrix; and conducting 3D rotation on the current video frame according to the fourth rotation matrix, and rebuilding an anti-shake video.

17 Claims, 1 Drawing Sheet

(56) References Cited

U.S. PATENT DOCUMENTS

2018/0232907 A1* 8/2018 Sung .................... H04N 17/002
2021/0006718 A1* 1/2021 Chen .................... H04N 23/689

FOREIGN PATENT DOCUMENTS

| CN | 109561253 A | 4/2019 |
| CN | 109788189 A | 5/2019 |
| CN | 109922267 A | 6/2019 |
| CN | 110519507 A | 11/2019 |

* cited by examiner

CAMERA LENS SMOOTHING METHOD AND PORTABLE TERMINAL

CROSS-REFERENCE TO RELATED APPLICATIONS

This application is a continuation of International Application No. PCT/CN2020/101987, with an international filing date of Jul. 15, 2020, which is based upon and claims priority to Chinese Patent Application No. 201910664290.2, filed with the Chinese Patent Office on Jul. 23, 2019, titled "CAMERA LENS SMOOTHING METHOD, APPARATUS AND PORTABLE TERMINAL", the entire contents of which are incorporated herein by reference.

TECHNICAL FIELD

The present disclosure belongs to the field of videos, and particularly relates to a smoothing method of a motion camera lens and a portable terminal.

BACKGROUND

At present, when a motion camera photographs a motion scene, a video lens for photographing may shake to affect the photographing quality and the watching experience of a video. Therefore, there is a need for studying a method of improving shaking of a video lens of a camera.

At present, one of solutions is to use a pan-tilt stabilization camera to enable a photographed picture to be stable. However, the disadvantages of this solution are that a pan-tilt is large in volume, and the problem that the picture shakes when a panorama photographing device is held by hands to photograph the video also exists.

SUMMARY

In the first aspect, embodiment of the present disclosure provides a camera lens smoothing method, including:
  obtaining a current video frame of a camera video and gyroscope information of the current video frame, and calculating a current first rotation matrix;
  conducting smoothing on the first rotation matrix, and calculating a third rotation matrix;
  conducting viewpoint decomposition on the current video frame according to the third rotation matrix, and calculating a fourth rotation matrix;
  conducting 3D rotation on the current video frame according to the fourth rotation matrix, and rebuilding an anti-shake video.

In the second aspect, embodiment of the present disclosure provides a computer readable storage medium, wherein the computer readable storage medium stores a computer program. When the computer program is executed by a processor, the steps of the camera lens smoothing method according to the first aspect are implemented.

In the third aspect, embodiment of the present disclosure provides a portable terminal, including:
  one or more processors;
  a memory; and
  one or more computer programs, stored in the memory and configured to be executed by the one or more processors, wherein when the processor executes the computer program, the steps of the camera lens smoothing method according to the first aspect are implemented.

DETAILED DESCRIPTION

In order to make the purposes, the technical solutions and the beneficial effects of the present disclosure more clearly and unambiguously, the present disclosure is further clarified based on the following drawings and examples. It should be understood that the specific embodiments described here are for illustrating and explaining the present disclosure merely, but not used for limiting the present disclosure.

The Chinese patent "entitled with Video Image Stabilization Method For Micro-Nano Satellite with a Publication No. CN106027852B" discloses a video image stabilization method for a micro-nano satellite, aiming to using only one attitude sensor-gyroscope on a built micro-nano satellite platform to process a shaking video by physical information obtained by the attitude sensor gyroscope in combination with information of the video photographed by a micro camera, to achieve image stabilization. However, the method requires to use the video information to conduct matching between a front frame and a back frame and the like and thus is relatively complex in process.

Embodiments of the present disclosure propose a camera lens smoothing method, an apparatus and a portable terminal and aims at enabling a video lens of a motion camera to conduct adaptive adjustment and thus preventing the video lens from shaking. By using the embodiments of the present disclosure, a cropping view angle may be reduced to the maximum while smoothing is conducted.

In order to describe the technical solutions of the present disclosure, description is made through the specific embodiments below.

Embodiment 1

Figure 1:
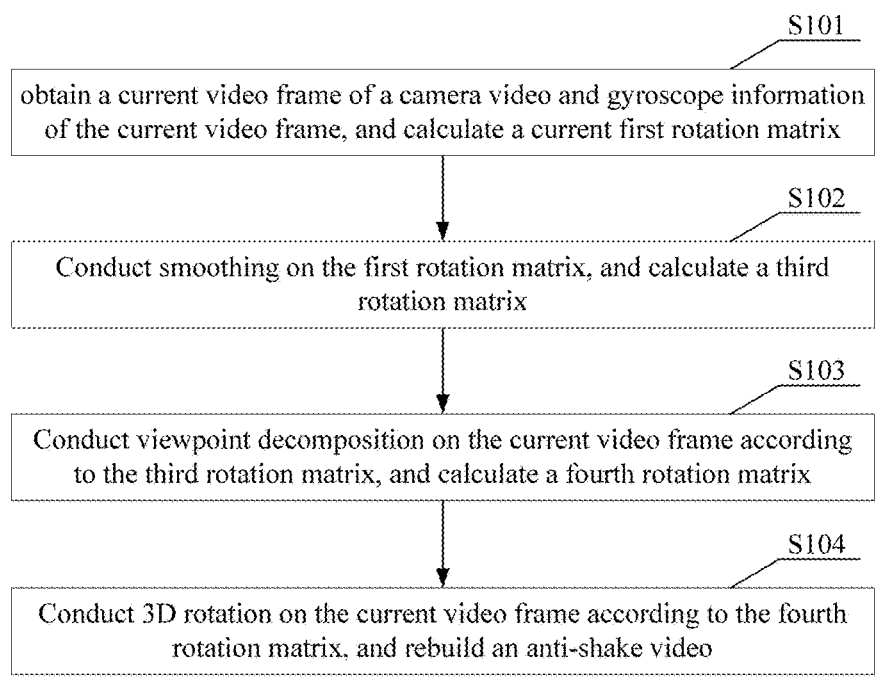
FIG. 1 is a flow chart of a camera lens smoothing method according to Embodiment 1 of the present disclosure.

Referring to FIG. 1, a camera lens smoothing method according to Embodiment 1 of the present disclosure includes the following steps:
  S101. obtaining a current video frame of a camera video and gyroscope information of the current video frame, and calculating a current first rotation matrix;
  the camera may be an ordinary motion camera and may further be a motion camera with a wide-angle lens and the like;
  the current video frame of the camera video is obtained;
  the gyroscope information corresponding to the current video frame is obtained; and
  the first rotation matrix is a current position matrix of the camera and is calculated by a method in the Chinese patent "entitled with Panoramic Video Anti-Shake Method, Apparatus And Portable terminal with an Application No. 2018115496436".
  S102. Conducting smoothing on the first rotation matrix, and calculating a third rotation matrix;
  the conducting smoothing on the first rotation matrix, and calculating a third rotation matrix specifically includes:
  S1021, conducting first smoothing on the first rotation matrix to obtain a second rotation matrix; and S1022, calculating the third rotation matrix of the camera by limiting smoothing maximum amplitude value.

A method of conducting first smoothing on the first rotation matrix to obtain the second rotation matrix specifically includes:

S10211, conducting first smoothing on a quaternion of the first rotation matrix with constrained least squares by employing N+1 windows, wherein N is a natural number larger than or equal to 1, and calculating to obtain the second rotation matrix, wherein the first smoothing employs a formula:

$$\tilde{q}_t^k = \arg\min \sum_{k=t-N/2}^{t+N/2} \|A(q_k) - A(q)\|_F^2, q \in S^3,$$

where $q=[v,u]^T$ is the quaternion, $$A(q) = (u^2 - \|v\|^2)I_{3\times 3} + 2vv^T - 2u[v]_x, [v]_x = \begin{bmatrix} 0 & -v_3 & v_2 \\ v_3 & 0 & -v_1 \\ -v_2 & v_1 & 0 \end{bmatrix}.$$

After the step S10211, second smoothing may further be conducted on the second rotation matrix by employing an iterative amplitude-limiting smoothing filtering method to obtain an updated second rotation matrix. The iterative amplitude-limiting smoothing filtering method specifically includes:

S102111: letting an initialization matrix equal to the second rotation matrix $\tilde{q}_t^0 = \tilde{q}_t^k$; and S102112: calculating the updated second rotation matrix by employing a spherical (Slerp) difference method as for the K-th iteration, wherein a calculation formula is: $\tilde{q}_t^k = \text{slerp}(\tilde{q}_{t-\delta t}^{k-1}, \tilde{q}_{t+\delta t}^{k-1}, 0.5)$, where $\delta t$ is a sampling time interval of a gyroscope, and K is a natural number larger than or equal to 1.

The calculating the third rotation matrix (which is a smoothing rotation matrix generated by calculating the first rotation matrix of the camera) of the camera by limiting the smoothing maximum amplitude value specifically includes:

S10221: limiting the smoothing maximum amplitude value to be $\delta\Theta$;

S10222: calculating a smoothing amplitude value of the second rotation matrix to the first rotation matrix, wherein a calculation formula is: $v = \text{Log}(\tilde{q}_t^k \otimes q_t^*)$, where * represents conjugation; and S10223: when $|v| \leq \delta\Theta$, letting the third rotation matrix $\tilde{q}_t$ equal to the second rotation matrix $\tilde{q}_t^k$, and when $|s| > \delta\Theta$, letting the third rotation matrix as follows: $\tilde{q}_t = \text{Exp}(\delta\Theta \square /|v|) \otimes q_t$, where $\otimes$ represents vector rotation of a quaternion space, Log is a quaternion log operator, and Exp is a quaternion exponential operator.

S103. Conducting viewpoint decomposition on the current video frame according to the third rotation matrix, and calculating a fourth rotation matrix;

The conducting viewpoint decomposition on the current video frame according to the third rotation matrix, and calculating the fourth rotation matrix specifically includes:

S1031: assuming V to be an original center viewpoint of the current video frame, and conducting smoothing rotation on the current video frame according to the third rotation matrix to obtain a center viewpoint of a smoothed video frame as $\hat{V}_t = \tilde{q}_t \cdot V$; and S1032: calculating the fourth rotation matrix according to the position of the center viewpoint of the smoothed video frame and a threshold of a pitch direction of a view angle of the camera.

The fourth rotation matrix is a motion matrix obtained after conducting smoothing rotation on the current video frame according to the third rotation matrix.

The threshold of the pitch direction of the view angle of the camera is set as $\Theta$, and calculation of the fourth rotation matrix is specifically as follows:

if a center viewpoint value of the camera is in the range of the threshold $\Theta$, the fourth rotation matrix is $R_t = [\hat{V}_t, 1, u]^T$, where $1 = \text{normize}(u \times \hat{V}_t)$ and $u = \text{normize}(\hat{V}_t \times 1)$;

if a center viewpoint direction of the camera is larger than the threshold $\Theta$, a direction of one side of the current video frame keeps invariable, and the side may be an upper side, a lower side, a left side or a right side; and then the fourth rotation matrix $R_t$ is calculated; specifically, if the direction of the left side of the current video frame keeps invariable, the fourth rotation matrix is as follows: $R_t = [V_t, 1, u]^T$, where $1_t = \text{normize}(u_t \times \hat{V}_t)$, $u_t = \text{normize}(\hat{V}_t \times 1_{t-1})$, $1_{t-1} = R^T_{:,2}$ and $R^T_{:,2}$ are a second column of vectors of $R^T$.

S104. Conducting 3D rotation on the current video frame according to the fourth rotation matrix, and rebuilding an anti-shake video.

The conducting 3D rotation on the current video frame according to the fourth rotation matrix, and rebuilding the anti-shake video specifically includes:

conducting 3D rotation on the current video frame according to the first rotation matrix and the fourth rotation matrix, and rebuilding the anti-shake video, through which a cropping view angle may be reduced to the maximum while smoothing is conducted.

In the embodiment of the present disclosure, the anti-shake effect for camera lens adaptive smoothing is achieved by obtaining an attitude matrix obtained through the gyroscope information of the camera, calculating the smoothing rotation matrix of the camera through smoothing and rotating the video. By using the embodiment of the present disclosure, a video photographed by an original camera keeps invariable while the view angle of the lens is smoothed, and the view angle of the lens may be automatically adjusted, so that a horizon direction keeps invariable when the lens conducts forward photographing; when photographing is conducted in a view angle of the sky or the ground, an orientation of one side (such as the left side) of an image keeps invariable; and the cropping view angle may be reduced to the maximum while smoothing is conducted.

Embodiment 2

Embodiment 2 of the present disclosure provides a computer readable storage medium. Computer programs are stored in the computer readable storage medium. When the computer programs are executed by a processor, the steps of the camera lens smoothing method according to Embodiment 1 of the present disclosure are implemented. The computer readable storage medium may be a non-transitory computer readable medium.

Embodiment 3

Figure 2:
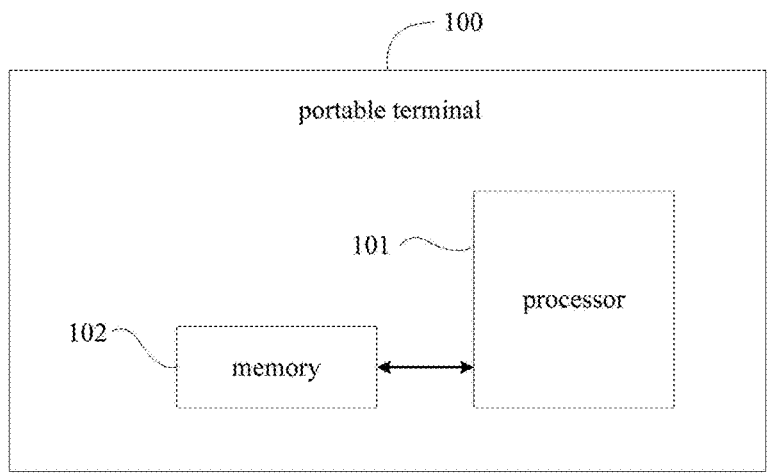
FIG. 2 is a structural schematic diagram of a portable terminal according to Embodiment 3 of the present disclosure.

FIG. 2 shows a specific block diagram of a structure of a portable terminal according to Embodiment 3 of the present disclosure. The portable terminal 100 includes: one or more processors 101, a memory 102 and one or more computer programs. The processors 101 and the memory 102 are connected through a bus; the one or more computer programs are stored in the memory 102 and configured to be executed by the one or more processors 101; and when the processor 101 executes the computer programs, the steps of the camera lens smoothing method according to Embodiment 1 of the present disclosure are implemented.

In the embodiments of the present disclosure, it will be appreciated by those of ordinary skill in the art that all or a part of the steps of implementing the embodiments described above in the method may be accomplished by programs instructing related hardware. The programs may be stored in one computer readable storage medium, and the storage medium may be a ROM/RAM, a magnetic disk, an optical disk or the like.

The foregoing is only preferred embodiments of the present disclosure and is not intended to be limiting of the present disclosure, and any modifications, equivalent substitutions, improvements and the like within the spirit and principles of the present disclosure are intended to be embraced by the protection range of the present disclosure.

What is claimed is:

1. A camera lens smoothing method, comprising the steps of:
   obtaining a current video frame of a camera video and gyroscope information of the current video frame, and calculating a first rotation matrix of a current pose of the camera;
   conducting smoothing on the first rotation matrix, and calculating a third rotation matrix;
   conducting viewpoint decomposition on the current video frame according to the third rotation matrix, and calculating a fourth rotation matrix;
   conducting 3D rotation on the current video frame according to the fourth rotation matrix, and rebuilding an anti-shake video;
   wherein the conducting smoothing on the first rotation matrix, and calculating a third rotation matrix specifically comprises:
   conducting first smoothing on the first rotation matrix to obtain a second rotation matrix; and
   calculating the third rotation matrix of the camera by limiting smoothing maximum amplitude value;
   wherein a method of conducting first smoothing on the first rotation matrix to obtain the second rotation matrix specifically comprises: conducting first smoothing on a quaternion of the first rotation matrix with constrained least squares by employing N+1 windows, and calculating the second rotation matrix.

2. The method according to claim 1, wherein the method of conducting first smoothing employs a formula:

$$\tilde{q}_t^k = \arg\min \sum_{k=t-N/2}^{t+N/2} \|A(q_k) - A(q)\|_F^2, q \in S^3,$$

where $q = [v, u]^T$ is the quaternion, $$A(q) = (u^2 - \|v\|^2)I_{3\times 3} + 2vv^T - 2u[v]_x, [v]_x = \begin{bmatrix} 0 & -v_3 & v_2 \\ v_3 & 0 & -v_1 \\ -v_2 & v_1 & 0 \end{bmatrix}.$$

3. The method according to claim 2, wherein the calculating the third rotation matrix of the camera by limiting the smoothing maximum amplitude value specifically comprises:
   limiting the smoothing maximum amplitude value to be $\delta\Theta$;
   calculating a smoothing amplitude value of the second rotation matrix to the first rotation matrix, wherein a calculation formula is: $v = \text{Log}(\tilde{q}_t^k \oplus q_t^*)$, where * represents conjugation;
   when $|v| \leq \delta\Theta$, letting the third rotation matrix $\dot{q}_t$ equal to the second rotation matrix $\tilde{q}_t^k$, and when $|v| > \delta\Theta$, letting the third rotation matrix as follows:
   $\dot{q}_t = \text{Exp}(\delta\Theta \cdot v/|v|) \oplus q_t$, where $\otimes$ represents vector rotation of a quaternion space, Log is a quaternion log operator, and Exp is a quaternion exponential operator.

4. The method according to claim 2, wherein after conducting the first smoothing on the first rotation matrix to obtain the second rotation matrix, second smoothing may further be conducted on the second rotation matrix by employing an iterative amplitude-limiting smoothing filtering method to obtain an updated second rotation matrix, specifically:
   letting an initialization matrix equal to the second rotation matrix $\tilde{q}_t^0 = \tilde{q}_t^k$; and
   calculating the updated second rotation matrix by employing a spherical (Slerp) difference method as for the K-th iteration, wherein a calculation formula is: $\tilde{q}_t^k = \text{slerp}(\tilde{q}_{t-\delta t}^{k-1}, \tilde{q}_{t+\delta t}^{k-1}, 0.5)$, where $\delta t$ is a sampling time interval of a gyroscope.

5. The method according to claim 1, wherein the conducting viewpoint decomposition on the current video frame according to the third rotation matrix, and calculating a fourth rotation matrix specifically comprises:
   assuming V to be an original center viewpoint of the current video frame, and conducting smoothing rotation on the current video frame according to the third rotation matrix to obtain a center viewpoint of a smoothed video frame as $\tilde{V}_t = \dot{q}_t \cdot V$;
   calculating the fourth rotation matrix according to the position of the center viewpoint of the smoothed video frame and a threshold of a pitch direction of a view angle of camera; wherein
   the fourth rotation matrix is a motion matrix obtained after conducting smoothing rotation on the current video frame according to the third rotation matrix.

6. The method according to claim 5, wherein calculation of the fourth rotation matrix is specifically as follows:
   the threshold of the pitch direction of the view angle of the camera is set as $\Theta$;
   if a center viewpoint value of the camera is in the range of the threshold $\Theta$, the fourth rotation matrix is $R_t = [\tilde{V}_t, 1, u]^T$, where $1 = \text{normize}(u \times \tilde{V}_t)$, and $u = \text{normize}(\tilde{V}_t \times 1)$;
   if a center viewpoint direction of the camera is larger than the threshold $\Theta$, a direction of one side of the current video frame keeps invariable, and the side may be an upper side, a lower side, a left side or a right side; and then the fourth rotation matrix $R_t$ is calculated, specifically: if the direction of the left side of the current video frame keeps invariable, the fourth rotation matrix is as follows: $R_t = [\tilde{V}_t, 1_t, u]^T$, where $1_t = \text{normize}(= \text{normize}(u_t \times \tilde{V}_t), u_t = \text{normize}(\tilde{V}_t \times 1_{t-1}), 1_{t-1} = R^T_{:,2}$ and $R^T_{:,2}$ are a second column of vectors of $R^T$.

7. A computer readable storage medium, wherein the computer readable storage medium stores a computer program; when the computer program is executed by a processor, cause the processor to perform:
obtaining a current video frame of a camera video and gyroscope information of the current video frame, and calculating a first rotation matrix of a current pose of the camera;
conducting smoothing on the first rotation matrix, and calculating a third rotation matrix;
conducting viewpoint decomposition on the current video frame according to the third rotation matrix, and calculating a fourth rotation matrix;
conducting 3D rotation on the current video frame according to the fourth rotation matrix, and rebuilding an anti-shake video;
wherein the conducting smoothing on the first rotation matrix, and calculating a third rotation matrix specifically comprises:
conducting first smoothing on the first rotation matrix to obtain a second rotation matrix; and
calculating the third rotation matrix of the camera by limiting smoothing maximum amplitude value;
wherein a method of conducting first smoothing on the first rotation matrix to obtain the second rotation matrix specifically comprises: conducting first smoothing on a quaternion of the first rotation matrix with constrained least squares by employing N+1 windows, and calculating the second rotation matrix.

8. The computer readable storage medium according to claim 7, wherein the method of conducting first smoothing employs a formula:

$$\tilde{q}_t^k = \arg\min \sum_{k=t-N/2}^{t+N/2} \|A(q_k) - A(q)\|_F^2, q \in S^3,$$

where $q=[v,u]^T$ is the quaternion, $$A(q) = (u^2 - \|v\|^2)I_{3\times 3} + 2vv^T - 2u[v]_x, [v]_x = \begin{bmatrix} 0 & -v_3 & v_2 \\ v_3 & 0 & -v_1 \\ -v_2 & v_1 & 0 \end{bmatrix}.$$

9. The computer readable storage medium according to claim 8, wherein the calculating the third rotation matrix of the camera by limiting the smoothing maximum amplitude value specifically comprises:
limiting the smoothing maximum amplitude value to be $\delta\Theta$;
calculating a smoothing amplitude value of the second rotation matrix to the first rotation matrix, wherein a calculation formula is: $v=\text{Log}(\tilde{q}_t^k \otimes q_t^*)$, where * represents conjugation;
when $|v| \leq \delta\Theta$, letting the third rotation matrix $\tilde{q}_t$ equal to the second rotation matrix $\tilde{q}t^k$, and when $|v| > \delta\Theta$, letting the third rotation matrix as follows:
$\tilde{q}_t = \text{Exp}(\delta\Theta \cdot v/|v|) \otimes q_t$, where $\otimes$ represents vector rotation of a quaternion space, Log is a quaternion log operator, and Exp is a quaternion exponential operator.

10. The computer readable storage medium according to claim 8, wherein after conducting the first smoothing on the first rotation matrix to obtain the second rotation matrix, second smoothing may further be conducted on the second rotation matrix by employing an iterative amplitude-limiting smoothing filtering method to obtain an updated second rotation matrix, specifically:

letting an initialization matrix equal to the second rotation matrix $\tilde{q}_t^0 = \tilde{q}_t^k$; and
calculating the updated second rotation matrix by employing a spherical (Slerp) difference method as for the K-th iteration, wherein a calculation formula is: $\tilde{q}_t^k = \text{slerp}(\tilde{q}_{t-\delta t}^{k-1}, \tilde{q}_{t+\delta t}^{k-1}, 0.5)$, where $\delta t$ is a sampling time interval of a gyroscope.

11. The computer readable storage medium according to claim 6, wherein the conducting viewpoint decomposition on the current video frame according to the third rotation matrix, and calculating a fourth rotation matrix specifically comprises:
assuming V to be an original center viewpoint of the current video frame, and conducting smoothing rotation on the current video frame according to the third rotation matrix to obtain a center viewpoint of a smoothed video frame as $\tilde{V}_t = \tilde{q}_t \cdot V$;
calculating the fourth rotation matrix according to the position of the center viewpoint of the smoothed video frame and a threshold of a pitch direction of a view angle of camera; wherein
the fourth rotation matrix is a motion matrix obtained after conducting smoothing rotation on the current video frame according to the third rotation matrix.

12. The computer readable storage medium according to claim 11, wherein calculation of the fourth rotation matrix is specifically as follows:
the threshold of the pitch direction of the view angle of the camera is set as $\Theta$;
if a center viewpoint value of the camera is in the range of the threshold $\Theta$, the fourth rotation matrix is $R_t = [\tilde{V}_t, 1, u]^T$, where $l = \text{normize}(u \times \tilde{V}_t)$ and $u = \text{normize}(\tilde{V}_t \times l)$;
if a center viewpoint direction of the camera is larger than the threshold $\Theta$, a direction of one side of the current video frame keeps invariable, and the side may be an upper side, a lower side, a left side or a right side; and then the fourth rotation matrix $R_t$ is calculated, specifically: if the direction of the left side of the current video frame keeps invariable, the fourth rotation matrix is as follows: $R_t = [\tilde{V}_t, l_t, u]^T$, where $l_t = \text{normize}(u_t \times \tilde{V}_t)$, $u_t = \text{normize}(\tilde{V}_t \times l_{t-1})$, $l_{t-1} = R^T_{:,2}$ and $R^T_{:,2}$ are a second column of vectors of $R^T$.

13. A portable terminal, comprising:
one or more processors;
a memory; and
one or more computer programs, stored in the memory and configured to be executed by the one or more processors, when the processor executes the computer program, the processor perform:
obtaining a current video frame of a camera video and gyroscope information of the current video frame, and calculating a first rotation matrix of a current pose of the camera;
conducting smoothing on the first rotation matrix, and calculating a third rotation matrix;
conducting viewpoint decomposition on the current video frame according to the third rotation matrix, and calculating a fourth rotation matrix;
conducting 3D rotation on the current video frame according to the fourth rotation matrix, and rebuilding an anti-shake video;
wherein the conducting smoothing on the first rotation matrix, and calculating a third rotation matrix specifically comprises:
conducting first smoothing on the first rotation matrix to obtain a second rotation matrix; and calculating the third rotation matrix of the camera by limiting smoothing maximum amplitude value;
wherein a method of conducting first smoothing on the first rotation matrix to obtain the second rotation matrix specifically comprises: conducting first smoothing on a quaternion of the first rotation matrix with constrained least squares by employing N+1 windows, and calculating the second rotation matrix.

14. The portable terminal according to claim 13, wherein the method of conducting first smoothing employs a formula:

$$\tilde{q}_t^k = \arg\min \sum_{k=t-N/2}^{t+N/2} \|A(q_k) - A(q)\|_F^2, \ q \in S^3,$$

where $q=[v,u]^T$ is the quaternion, $$A(q) = (u^2 - \|v\|^2)I_{3\times 3} + 2vv^T - 2u[v]_x, \ [v]_x = \begin{bmatrix} 0 & -v_3 & v_2 \\ v_3 & 0 & -v_1 \\ -v_2 & v_1 & 0 \end{bmatrix}.$$

15. The portable terminal according to claim 14, wherein the calculating the third rotation matrix of the camera by limiting the smoothing maximum amplitude value specifically comprises:
limiting the smoothing maximum amplitude value to be $\delta\Theta$;
calculating a smoothing amplitude value of the second rotation matrix to the first rotation matrix, wherein a calculation formula is: $v=\text{Log}(\tilde{q}_t^k \otimes q_t^*)$, where * represents conjugation;
when $|v| \leq \delta\Theta$, letting the third rotation matrix $\tilde{q}_t$ equal to the second rotation matrix $\tilde{q}_t^k$, and when $|v| > \delta\Theta$, letting the third rotation matrix as follows:
$\tilde{q}_t = \text{Exp}(\delta\Theta \cdot v/|v|) \otimes q_t$, where $\otimes$ represents vector rotation of a quaternion space, Log is a quaternion log operator, and Exp is a quaternion exponential operator.

16. The portable terminal according to claim 14, wherein after conducting the first smoothing on the first rotation matrix to obtain the second rotation matrix, second smoothing may further be conducted on the second rotation matrix by employing an iterative amplitude-limiting smoothing filtering method to obtain an updated second rotation matrix, specifically: letting an initialization matrix equal to the second rotation matrix $\tilde{q}_t^0 = \tilde{q}_t^k$; and
calculating the updated second rotation matrix by employing a spherical (Slerp) difference method as for the K-th iteration, wherein a calculation formula is: $\tilde{q}_t^k = \text{slerp}(\tilde{q}_{t-\delta t}^{k-1}, q_{t+\delta t}^{k-1}, 0.5)$, where $\delta t$ is a sampling time interval of a gyroscope.

17. The portable terminal according to claim 13, wherein the conducting viewpoint decomposition on the current video frame according to the third rotation matrix, and calculating a fourth rotation matrix specifically comprises:
assuming V to be an original center viewpoint of the current video frame, and conducting smoothing rotation on the current video frame according to the third rotation matrix to obtain a center viewpoint of a smoothed video frame as $\tilde{V}_t = \tilde{q}_t \cdot V$;
calculating the fourth rotation matrix according to the position of the center viewpoint of the smoothed video frame and a threshold of a pitch direction of a view angle of camera; wherein
the fourth rotation matrix is a motion matrix obtained after conducting smoothing rotation on the current video frame according to the third rotation matrix.

* * * * *